United States Patent
Hussain

Patent Number: 6,041,665
Date of Patent: Mar. 28, 2000

[54] MASS FLOW METER WHICH OPERATES ACCORDING TO THE CORIOLOS PRINCIPLE

[75] Inventor: Yousif A. Hussain, Northampton, United Kingdom

[73] Assignee: Krohne A.G., Switzerland

[21] Appl. No.: 08/983,255

[22] PCT Filed: May 28, 1997

[86] PCT No.: PCT/EP97/02783

§ 371 Date: Jul. 29, 1998

§ 102(e) Date: Jul. 29, 1998

[87] PCT Pub. No.: WO97/45708

PCT Pub. Date: Dec. 4, 1997

[30] Foreign Application Priority Data

May 29, 1996 [DE] Germany ............... 196 21 365

[51] Int. Cl.[7] ............... G01F 1/84
[52] U.S. Cl. ............... 73/861.357
[58] Field of Search ............... 73/861.355, 861.356, 73/861.357

[56] References Cited

U.S. PATENT DOCUMENTS

| | | | |
|---|---|---|---|
| 5,253,533 | 10/1993 | Lam et al. | 73/861.357 |
| 5,339,690 | 8/1994 | Bar-Avi | 73/505 |
| 5,423,225 | 6/1995 | Cage | 73/861.357 |
| 5,448,921 | 9/1995 | Cage et al. | 73/861.357 |

FOREIGN PATENT DOCUMENTS

| | | |
|---|---|---|
| 4-155221 | 5/1992 | Japan . |
| 6-235652 | 8/1994 | Japan . |
| 2 227 318 | 12/1988 | United Kingdom . |

*Primary Examiner*—Harshad Patel
*Attorney, Agent, or Firm*—Cesari and McKenna, LLP

[57] ABSTRACT

A mass flow meter for flowing media, which operates according to the Coriolis principle, has one straight Coriolis measuring tube, several oscillation generators acting on the Coriolis measuring tube and several sensors detecting Coriolis forces and/or Coriolis oscillations based on Coriolis forces. The oscillation generators are designed and arranged so that the Coriolis measuring tube oscillates around its longitudinal axis enabling the flow of gases to be measured with high measuring accuracy.

18 Claims, 6 Drawing Sheets

MASS FLOW METER WHICH OPERATES ACCORDING TO THE CORIOLOS PRINCIPLE

The invention concerns a mass flow meter for flowing media, which operates according to the Coriolis principle, with one at least basically straight Coriolis measuring tube, with at least one oscillation generator acting on the Coriolis measuring tube, and with at least one sensor detecting Coriolis forces and/or Coriolis oscillations based on Coriolis forces.

BACKGROUND OF THE INVENTION

Mass flow meters for flowing media, which operate according to the Coriolis principle, are known in different designs (cf. e.g. German Patent Specification 41 24 295 and German Offenlegungsschrift 41 43 361 and the publications cited there in each case in column 1, lines 20 to 27, German Patent Specification 42 24 397 and the publications cited there in column 1, lines 23 to 30, as well as German Offenlegungsschrift 196 01 342) and have been increasingly used in practice for some time.

In the case of mass flow meters for flowing media, which operate according to the Coriolis principle, basically there are, on the one hand, those whose Coriolis measuring tube is made at least essentially straight, as a rule exactly straight, and, on the other hand, those whose Coriolis measuring tube is made loop-shaped. In addition, in the case of the mass flow meters under discussion there are, on the one hand, those which have only one Coriolis measuring tube and, on the other hand, those which have two Coriolis measuring tubes. In the case of the embodiments with two Coriolis measuring tubes, they can be hydraulically in series or parallel to one another.

Mass flow meters of the type in question, in the case of which the Coriolis measuring tube is, or the Coriolis measuring tubes are, made straight, with respect to their mechanical construction are simple and can consequently be produced at relatively low cost. In this case, it is also possible to finish or polish the inner surfaces of the Coriolis measuring tube or Coriolis measuring tubes well; they can be polished easily. In addition, they have a relatively low pressure loss. In the case of mass flow meters which operate according to the Coriolis principle, and in the case of which the Coriolis measuring tube is made straight, or the Coriolis measuring tubes are made straight, it can be disadvantageous that both thermally caused expansions or stresses, as well as forces and moments acting from outside, can lead to measurement errors and to mechanical damage, namely stress cracks.

The experts have already dealt with the above-mentioned problems in mass flow meters with straight Coriolis measuring tubes (cf. in particular German Patent Specification 41 24 295, German Offenlegungsschrift 41 43 361, and German Patent Specification 42 24 379). Altogether, a mass flow meter operating according to the Coriolis principle, with a straight Coriolis measuring tube, which has a measurement error of only about 0.1% (cf. the prospectus "Zulassung des Corimass G-Gerätes zum eichpflichtigen Verkehr" of the KROHNE Meβtechnk GmbH & Co. KG), was made successfully.

Mass flow meters operating according to the Coriolis principle, which have only one straight Coriolis measuring tube, have considerable advantages as compared with those mass flow meters which have either two straight Coriolis measuring tubes or one loop-shaped Coriolis measuring tube. The advantage as compared with mass flow meters with two straight Coriolis measuring tubes in particular is to be seen in the fact that flow separators or flow combiners, which are required in the case of mass flow meters with two Coriolis measuring tubes, are not needed. The advantage as compared with flow meters with one loop-shaped Coriolis measuring tube, or with two loop-shaped Coriolis measuring tubes, in particular is to be seen in the fact that a straight Coriolis measuring tube can be easier to produce than a loop-shaped Coriolis measuring tube, that the pressure drop in the case of a straight Coriolis measuring tube is less than in the case of a loop-shaped Coriolis measuring tube, and that a straight Coriolis measuring tube can be cleaned better than a loop-shaped Coriolis measuring tube.

However, mass flow meters which operate according to the Coriolis principle and have one straight Coriolis measuring tube, also have a physically, or mechanically, predetermined disadvantage (cf. European Offenlegungsschrift 0 521 439).

The mass flow meters operating according to the Coriolis principle require that the Coriolis measuring tube be put into oscillation, and in particular by means of at least one oscillation generator; the Coriolis forces, or the Coriolis oscillations, do indeed result from the fact that the Coriolis measuring tube oscillates and from the flowing of mass through the Coriolis measuring tube.

In the case of mass flow meters with two straight Coriolis measuring tubes, or with one loop-shaped Coriolis measuring tube, or with two loop-shaped Coriolis measuring tubes, the Coriolis measuring tubes, or the parts of the loop-shaped Coriolis measuring tubes causing oscillation, are designed identically and, as a rule, located and excited into oscillation so that they oscillate opposite one another. This has the positive consequence that the oscillating system as a whole is not acting as such outwards. The position of the center of mass remains constant and forces which appear are compensated. Consequently, no forces and no oscillations are introduced into the pipeline system in which this mass flow meter is installed, and forces and oscillations of the pipeline system do not influence the measurement result.

In the case of mass flow meters operating according to the Coriolis principle, which have only one straight Coriolis measuring tube, the positive consequence of the Coriolis measuring tubes oscillating opposite one another, explained above, naturally does not occur. The center of mass does not remain constant and forces which appear are not compensated. The consequence of this is, on the one hand, that forces and oscillations are transferred into the pipeline system in which a mass flow meter is installed, and, on the other, that forces and oscillations acting on the mass flow meter, derived from the pipeline system, can influence the measurement result.

The known mass flow meters operating according to the Coriolis principle, explained in detail previously, are indeed directly suitable today for measuring the flow of liquids with a high measurement accuracy, namely with a measurement accuracy of 0.1%. However, they are not suited for the measurement of the flow of gases in the same way. Consequently, the object of the invention is to provide a mass flow meter of the type under consideration, which can also measure the flow of gases with a high measurement accuracy.

SUMMARY OF THE INVENTION

The mass flow meter in accordance with the invention, which solves the problem presented previously, is now first of all and essentially characterized by the fact that the oscillation generator or the oscillation generators is or are designed and arranged so that the Coriolis measuring tube oscillates around its longitudinal axis. On the one hand, in this way the Coriolis measuring tube can be designed with a relatively short length and with a relatively large diameter. This results in low production costs and a small pressure loss. On the other hand, the oscillation of the Coriolis measuring tube around its longitudinal axis realized in accordance with the invention leads to the fact that the mass flow meter in accordance with the invention is relatively insensitive to forces and oscillations which are exerted on the mass flow meter by the pipeline system in which such a mass flow meter is installed. Actually, the forces and oscillations which are exerted on this mass flow meter by the pipeline system in which a mass flow meter in accordance with the invention is installed are those which act horizontally, vertically, or axially, but not those which take effect as oscillations around the longitudinal axis of the Coriolis measuring tube. Consequently, forces and oscillations coming from outside practically do not influence the oscillations of the Coriolis measuring tube around its longitudinal axis, so that consequently such forces and oscillations also practically do not influence the measurement result. This again has the consequence that the mass flow meter in accordance with the invention can be designed to be particularly measurement-sensitive, because external influences practically do not influence the measurement result. Finally, from this it follows that the mass flow meter in accordance with the invention is also particularly suited for gasses as a flowing medium, because, in this case, the Coriolis forces which appear are relatively low, consequently a high measurement sensitivity is required.

In the case of the mass flow meter in accordance with the invention, the measuring tube, which can be made e.g. out of stainless steel, Hastelloy, titanium, or zirconium, can be made entirely differently with respect to its cross-section. In particular, the Coriolis measuring tube can have an elliptical, a circular, a rectangular, therefore also a square, or an approximately figure-eight cross-section.

In the case of the mass flow meter in accordance with the invention, the cross-section of the Coriolis measuring tube—as viewed along its length—does not have to be constant, therefore the Coriolis measuring tube can—as viewed along its length—have a different cross-section and/or cross-sectional shape. In particular, it can be advantageous if the Coriolis measuring tube has a circular cross-section on both of its ends and an elliptical cross-section in the middle. In this case, the transition from the circular cross-section at the ends to the elliptical cross-section in the middle naturally should be continuous.

For the theory of the invention, it is significant that the oscillation generator, or as a rule—the oscillation generators, is or are designed and located so that the Coriolis measuring tube oscillates around its longitudinal axis. In particular, this allows the designer a number of possibilities for designing and locating the oscillation generator or the oscillation generators. In particular, as known in the prior art, electro-magnetic or piezo-electric oscillation generators can be used. In any case, it is recommended that the oscillation generator or the oscillation generators—as viewed along the length of the Coriolis measuring tube—be located in the middle of the Coriolis measuring tube, so that the oscillation of the Coriolis measuring tube around its longitudinal axis, caused by the oscillation generator or the oscillation generators, is symmetrical to the middle of the Coriolis measuring tube. Naturally, the same result is obtained when an oscillation generator or oscillation generators is provided with a symmetrical distance to the middle of the Coriolis measuring tube from both sides.

In the case of mass flow meters operating according to the Coriolis principle, the usual oscillation generators, including both electromagnetic as well as piezo-electric oscillation generators, initially generate a back and forth motion. There are different possibilities for having the result intended by the invention be achieved by this back and forth motion of the oscillation generator, namely an oscillation of the Coriolis measuring tube around its longitudinal axis. An embodiment of the mass flow meter in accordance with the invention, preferred in this respect, is characterized by the fact that two oscillation generators are provided and the two oscillation generators act on the Coriolis measuring tube preferably offset by 180° in the same direction tangentially. Instead of providing only two oscillation generators, an even greater number of oscillation generators can be provided, for example four oscillation generators can be provided, the oscillation generators then acting on the Coriolis measuring tube preferably offset by 90° in the same direction tangentially. In the same direction means here that all oscillation generators are operative e.g. in the clockwise direction at the same time or in the counterclockwise direction at the same time.

According to a further theory of the invention, which has a very special significance, a preferred embodiment of the mass flow meter in accordance with the invention is to characterized by the fact that four oscillation generators are provided, that the oscillation generators act on the Coriolis measuring tube preferably offset by 90°, that two oscillation generators offset by 180° act on the Coriolis measuring tube in the opposite direction tangentially and the two other oscillation generators, offset by 180° with respect to one another and in each case offset by 90° with respect to the first two oscillation generators, act on the Coriolis measuring tube in the same direction radially, and that the forces exerted by the two first oscillation generators are directed in the opposite direction to the forces exerted by the other two oscillation generators. The result of this is that, at any moment, on the one hand the sum of the forces exerted by the oscillation generators on the Coriolis measuring tube—and naturally also the sum of all reaction forces—is zero, that, on the other hand, the position of the center of mass of the Coriolis measuring tube—and that, in addition to this, the position of the center of mass of the mass flow meter in accordance with the invention as a whole—remains constant. The extremely important consequence of this is that the mass flow meter so designed is free of the disadvantages described initially, which actually are characteristic of mass flow meters which operate according to the Coriolis principle and have only one straight Coriolis measuring tube.

According to a further theory of the invention, which again acquires considerable special significance, a special embodiment of the mass flow meter in accordance with the invention is characterized by the fact that bars, preferably two, three, or four bars, under certain circumstances even more bars, extending—like fins—in the longitudinal direction of the Coriolis measuring tube, are provided on the inside of the Coriolis measuring tube, the bars being arranged so that they are distributed preferably regularly over the circumference of the Coriolis measuring tube. The Coriolis forces which appear act on the bars provided on the inside of the Coriolis measuring tube and thus on the Coriolis measuring tube.

In the case of all embodiments of mass flow meters in accordance with the invention described until now, the designer has extensive freedom with respect to the configuration and arrangement of the sensors. The sensors can, as known in the prior art, also be designed like the oscillation generators, e.g. electro-magnetically or piezo-electrically.

Moreover, it is recommended that two sensors be provided and that the two sensors —as viewed along the length of the Coriolis measuring tube—be arranged symmetrical to the middle of the Coriolis measuring tube. Naturally there is also the possibility of providing more than two sensors, namely—as viewed along the length of the Coriolis measuring tube—in each case providing several sensors symmetrical to the middle of the Coriolis measuring tube and arranging the sensors so that they are distributed uniformly over the circumference of the Coriolis measuring tube.

Previously it was stated that the mass flow meter under consideration has a straight Coriolis measuring tube, at least one oscillation generator acting on the Coriolis measuring tube, and at least one sensor detecting Coriolis forces and/or Coriolis oscillations based on Coriolis forces. As known in the prior art, in the case of the mass flow meter in accordance with the invention, the Coriolis measuring tube can also be located concentrically within a bridge preferably made circular-cylindrical. In this case, it is recommended that the oscillation generator or the oscillation generators and the sensor or the sensors be located between the Coriolis measuring tube and the bridge so that the oscillation generator or the oscillation generators and the sensor or the sensors are operative between the Coriolis measuring tube and the bridge.

Finally, it is recommended that at least one temperature sensor for compensation of thermal influences on the measurement accuracy and/or the zero point, as known in the prior art, also be provided in the case of the mass flow meter in accordance with the invention If the mass flow meter in accordance with the invention, has a bridge holding the Coriolis measuring tube as described previously, it is recommended that both the Coriolis measuring tube as well as the bridge be provided with a temperature sensor.

In particular there are now a number of possibilities for designing and developing the mass flow meter in accordance with the invention. For these, refer to the dependent claims on the one hand, and the description of preferred embodiments in connection with the drawings on the other hand.

DETAILED DESCRIPTION OF ILLUSTRATIVE EMBODIMENTS

The mass flow meter for flowing media in accordance with the invention, in particular for gasses, is one which operates in accordance with the Coriolis principle. In the first place, as a rule, but not functionally necessarily, a housing 1 indicated only in FIGS. 3 and 4, belongs to the mass flow meter in accordance with the invention. An at least essentially, as a rule and in the embodiment shown exactly, straight Coriolis measuring tube 2, at least one oscillation generator 3 acting on the Coriolis measuring tube 2, and at least one sensor 4, as a rule two sensors 4, detecting Coriolis forces and/or Coriolis oscillations caused by Coriolis forces are functionally necessary for the mass flow meter in accordance with the invention.

In accordance with the invention, the oscillation generators 3 in the first place are designed and arranged so that the Coriolis measuring tube 2 oscillates around its longitudinal axis.

Figure 1A:
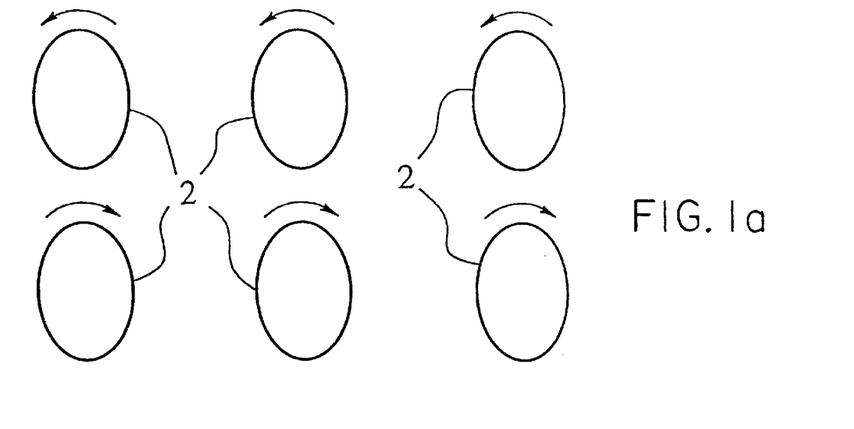
FIGS. 1a to 1c show a graphic representation for the general explanation of the teaching of the invention.
Figure 1B:
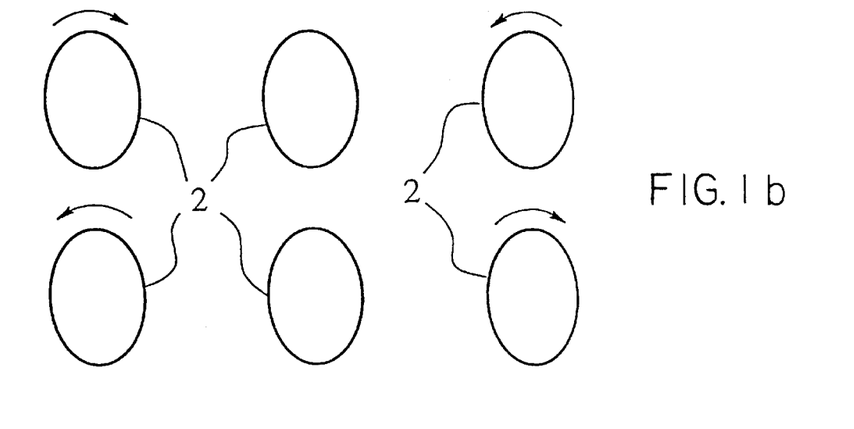
Figure 1C:
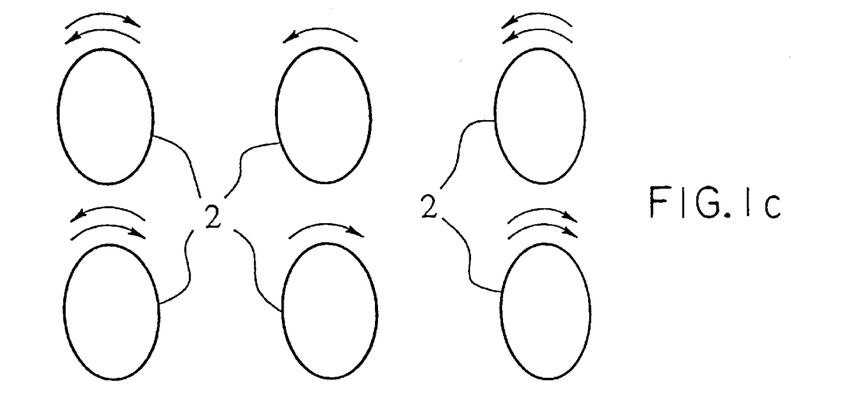
Figure 5:
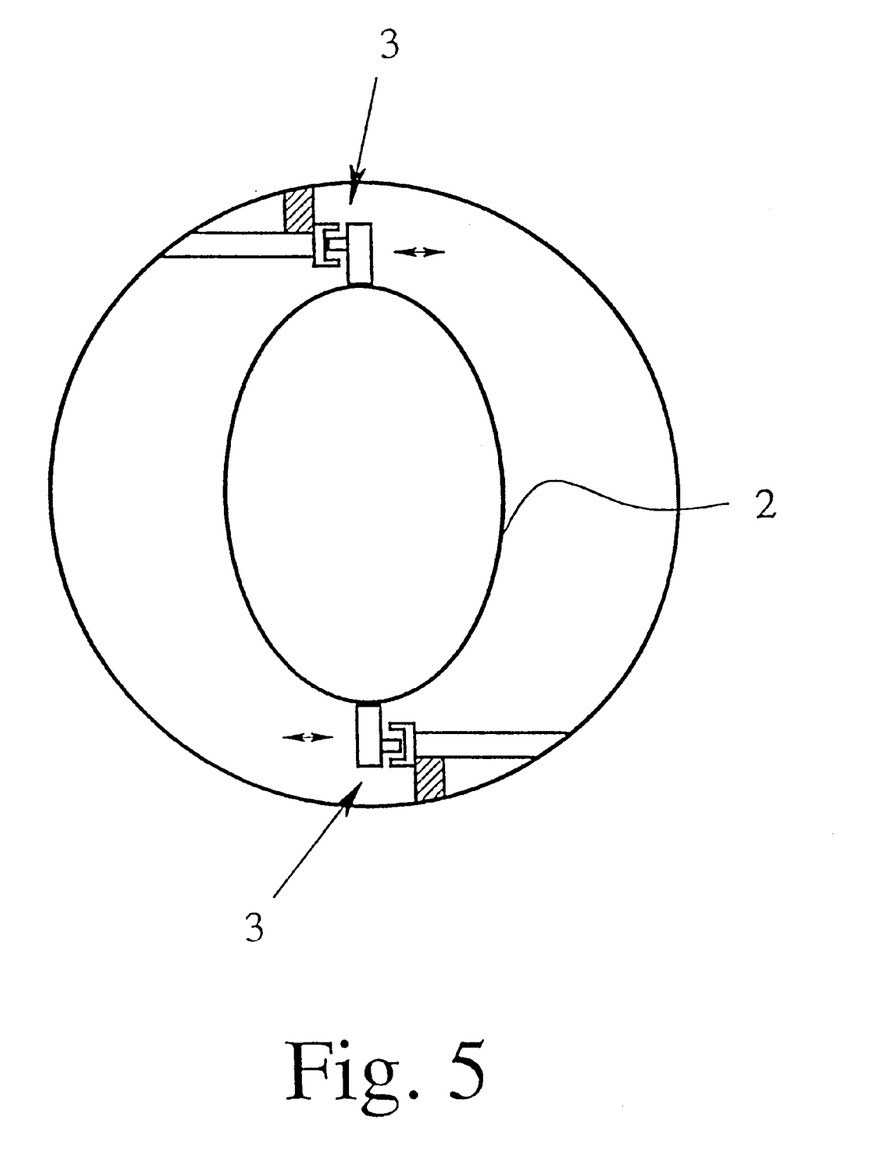
FIG. 5 shows a cross-section through a preferred embodiment of a mass flow meter in accordance with the invention.
Figure 6:
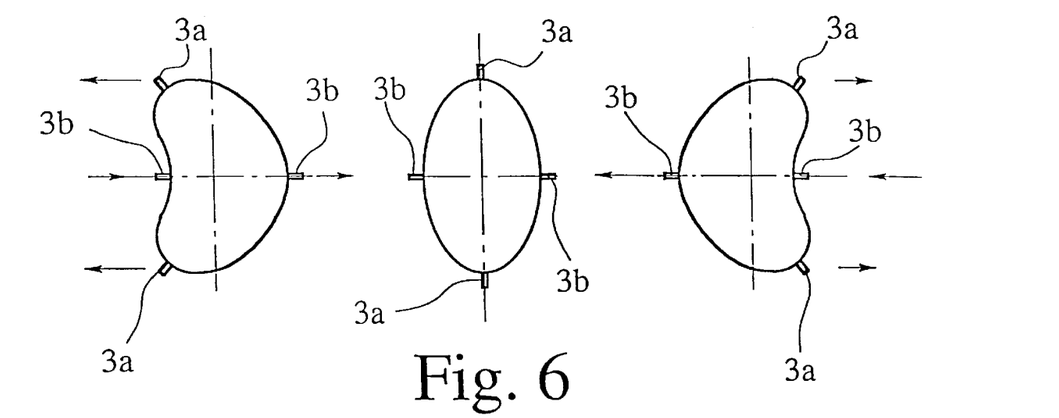
FIG. 6 shows a graphic representation for explaining a further embodiment of the invention.
Figure 9:
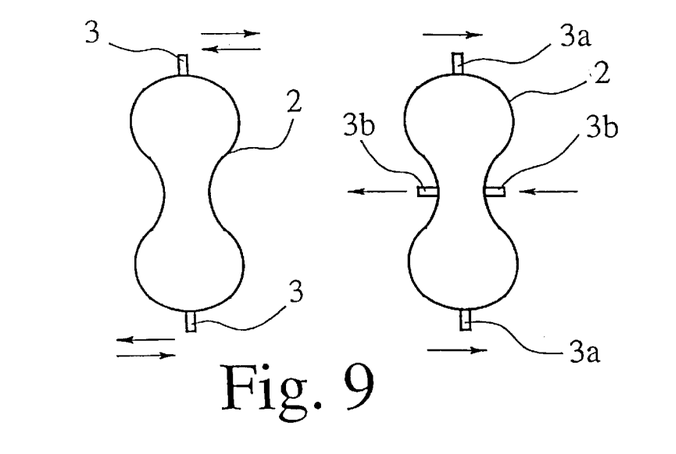
FIG. 9 shows a graphic representation—corresponding to FIGS. 1 and 6—for explaining a further embodiment of a mass flow meter in accordance with the invention.

In particular, it can be deduced from FIGS. 1, 5, and 6 that the Coriolis measuring tube 2 can have an elliptical cross-section. In the embodiment shown in FIG. 9, the Coriolis measuring tube 2 has an approximately figure eight-shaped cross-section. As FIG. 9 shows, this is not a strictly figure eight-shaped cross-section here. The cross-section shown here also can be called a double-circular cross-section, two circular partial cross-sections being connected with one another by means of a neck-like middle part. For the embodiment to which FIGS. 10, 11, and 12 refer, it is the case that the Coriolis measuring tube 2 has a circular cross-section.

Figure 2:
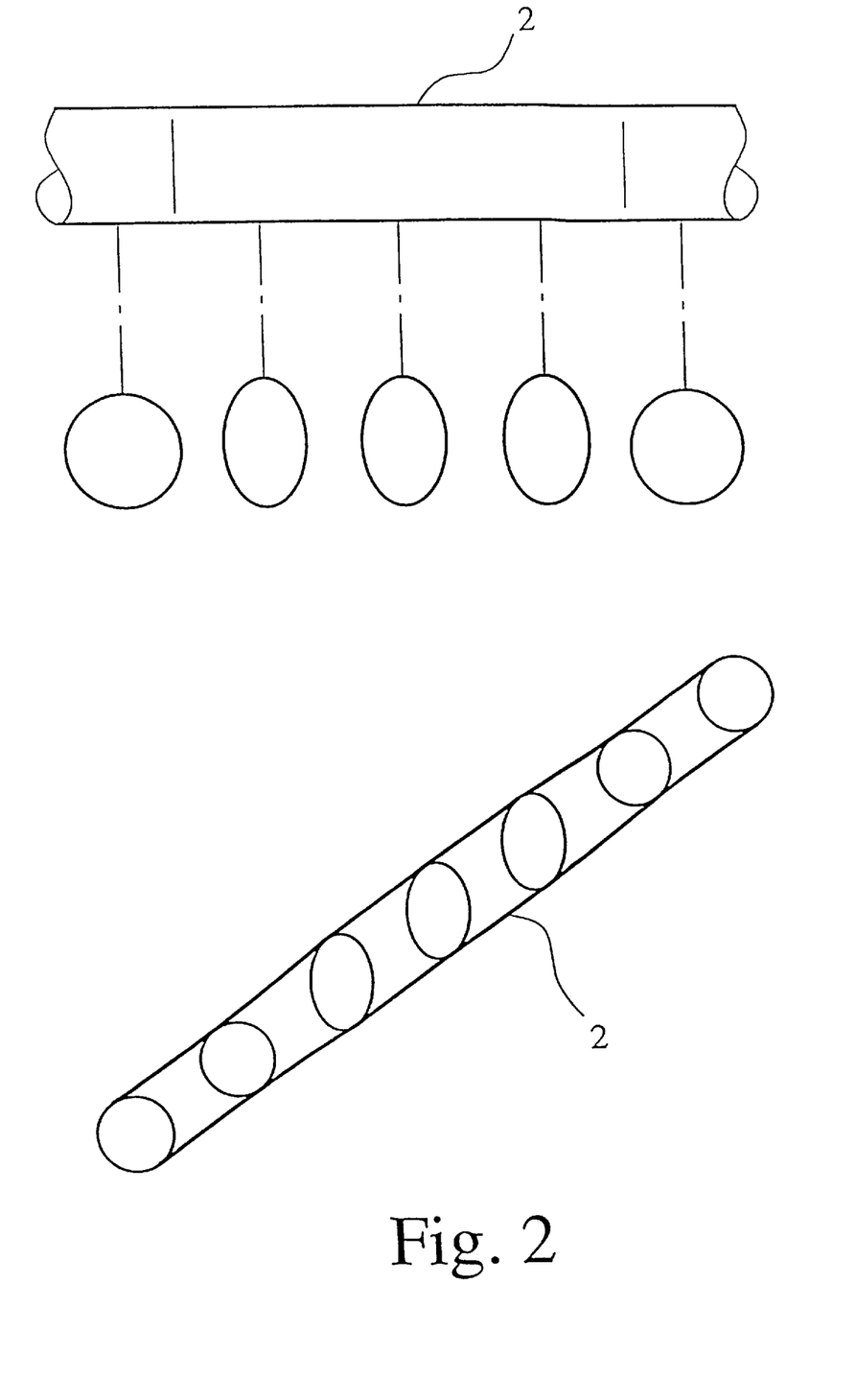
FIG. 2 shows a preferred embodiment of a Coriolis measuring tube belonging to a mass flow meter in accordance with the invention.
Figure 4:
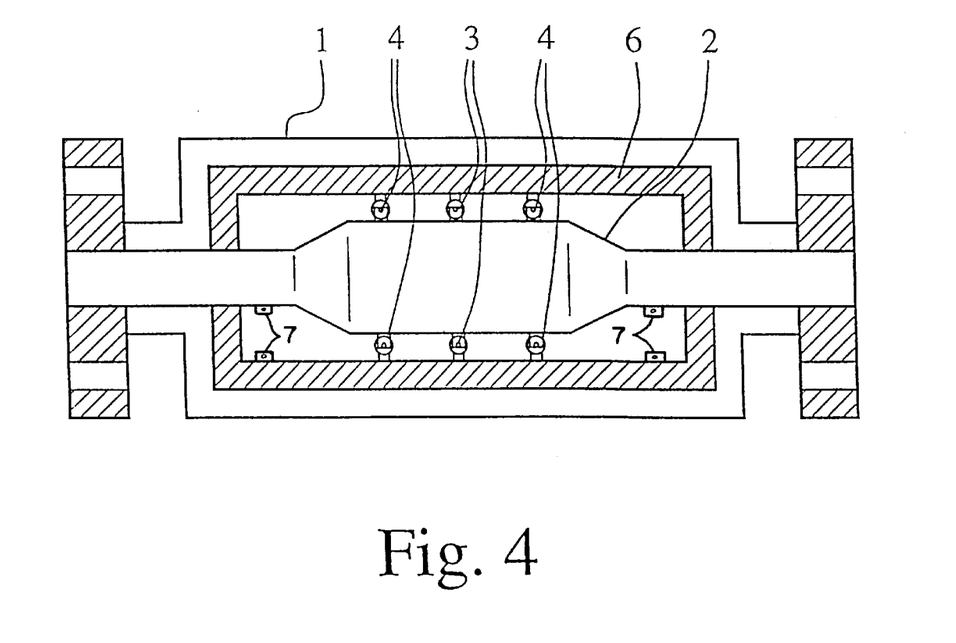
FIG. 4 shows a longitudinal section through a second embodiment of a mass flow meter in accordance with the invention.

Moreover, it can be deduced from FIGS. 2 and 4 that the Coriolis measuring tube 2 —as viewed along its length—can have different cross-sections or different cross-sectional shapes. In both embodiments, the Coriolis measuring tube 2 has a circular cross-section on both of its ends and an elliptical cross-section in the middle, in which case, as FIG. 2 shows in particular, the transition is continuous from the circular cross-section on both ends to the elliptical cross-section in the middle.

In FIG. 1a, the arrows indicate that the Coriolis measuring tube 2 oscillates around its longitudinal axis, on the one hand counterclockwise, on the other hand clockwise. The entry side end of the Coriolis measuring tube 2 is on the left, the middle of the Coriolis measuring tube 2 is in the middle, and the exit side end of the Coriolis measuring tube 2 is shown on the right. This obtains also for FIGS. 1b and 1c.

In FIG. 1b, the arrows indicate how the emerging Coriolis forces act in the case of a medium flowing through the Coriolis measuring tube 2. The effects on the exit side end of the Coriolis measuring tube 2 are opposed to the effects on the entry side end of the Coriolis measuring tube 2. Coriolis forces do not appear in the middle of the Coriolis measuring tube 2.

The arrows in FIG. 1c, show, on the one hand, the oscillation of the Coriolis measuring tube 2 around its longitudinal axis, and, on the other hand, the effects of the Coriolis forces which appear.

Figure 3:
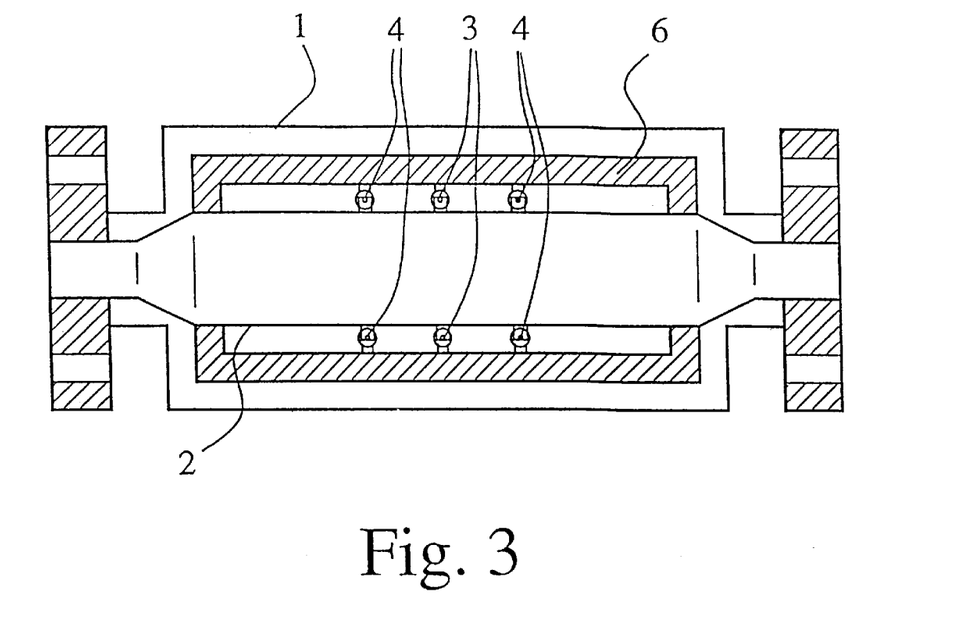
FIG. 3 shows a longitudinal section through a first embodiment of a mass flow meter in accordance with the invention.

Two oscillation generators 3 are provided for the embodiments of mass flow meters in according with the invention to which FIGS. 3, 4, and 5 refer, and the two oscillation generators 3 act on the Coriolis measuring tube 2 offset by 180° in the same direction tangentially. There is also the possibility of providing more than two oscillation generators 3, for example four oscillation generators 3, which then act on the Coriolis measuring tube 2 offset by 90° in the same direction tangentially.

Figure 7:
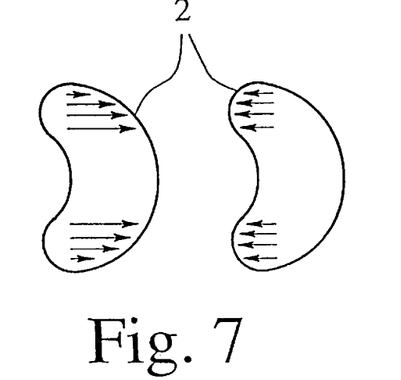
FIG. 7 shows a graphic representation for explaining the Coriolis forces appearing in the case of the embodiment of the invention in accordance with FIG. 6.
Figure 8:
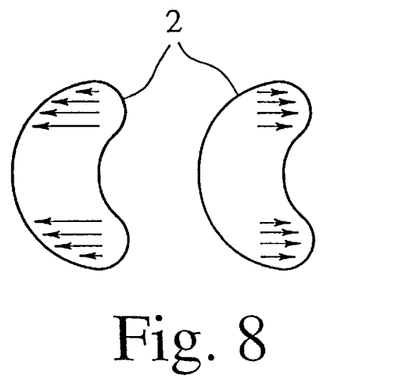
FIG. 8 shows a graphic representation corresponding to FIG. 7.

In the case of the embodiment of a mass flow meter in accordance with the invention to which FIGS. 6, 7, and 8 refer, a further embodiment of the invention is realized, which acquires very special significance. Four oscillation generators 3a, 3a, 3b, 3b are provided for this embodiment, the oscillation generators acting on the Coriolis measuring tube being offset by 90°. Two oscillation generators 3a located offset with respect one another by 180° act on the Coriolis measuring tube in the opposite direction tangentially, and the two other oscillation generators 3b offset by 180° with respect to one another and with respect to the first two oscillation generators 3a in each case by 90°, act on the Coriolis measuring tube 2 in the same direction radially. The forces exerted by the first two oscillation generators 3a are directed in the opposite direction to the forces exerted by the other two oscillation generators 3b. In this way, it is achieved that, at any moment, on the one hand the sum of the forces exerted by the oscillation generators 3a and 3b on the Coriolis measuring tube 2—and naturally also the sum of all reaction forces—is zero, and that, on the other hand, the position of the center of mass of the Coriolis measuring tube and that, in addition to this, the position of the center of mass of the mass flow meter in accordance with the invention as a whole-remains constant. The pronounced positive consequence of this is that the mass flow meter thus designed is free of the disadvantages described initially, which are actually characteristic of mass flow meters which operate according to the Coriolis principle and have only one straight Coriolis measuring tube 2.

The arrows in FIGS. 7 and 8 show how the Coriolis forces act on the Coriolis measuring tube 2, when the oscillation generators 3a and 3b act on the Coriolis measuring tube 2 as is shown in FIG. 6.

If only for the sake of accuracy, it is to be noted that the deformations of the Coriolis measuring tube 2 appearing because of the oscillation generators 3a and 3b, on the one hand, and those appearing as a result of the Coriolis forces, on the other hand, are shown very exaggerated.

Figure 10:
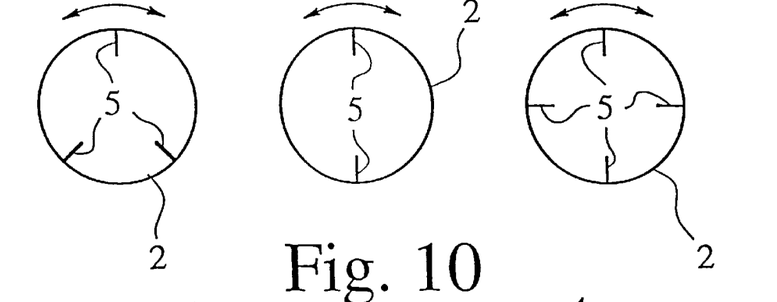
FIG. 10 shows a cross-section through differently designed embodiments of a further embodiment of a mass flow meter in accordance with the invention.
Figure 11:
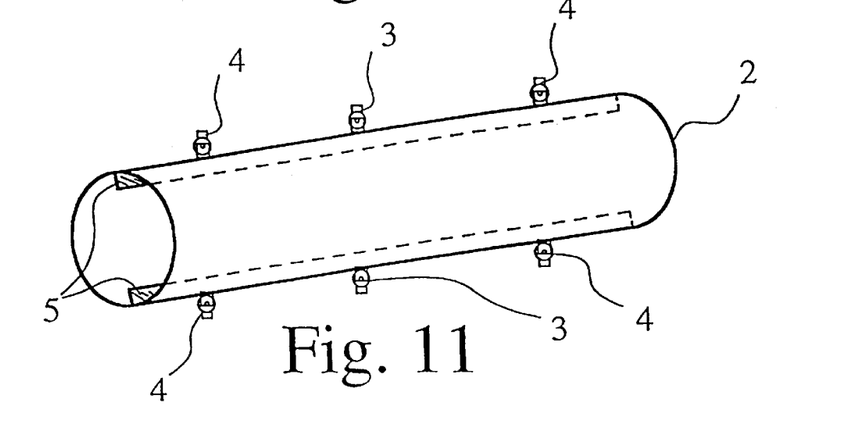
FIG. 11 shows a perspective representation of a flow meter in FIG. 10.
Figure 12:
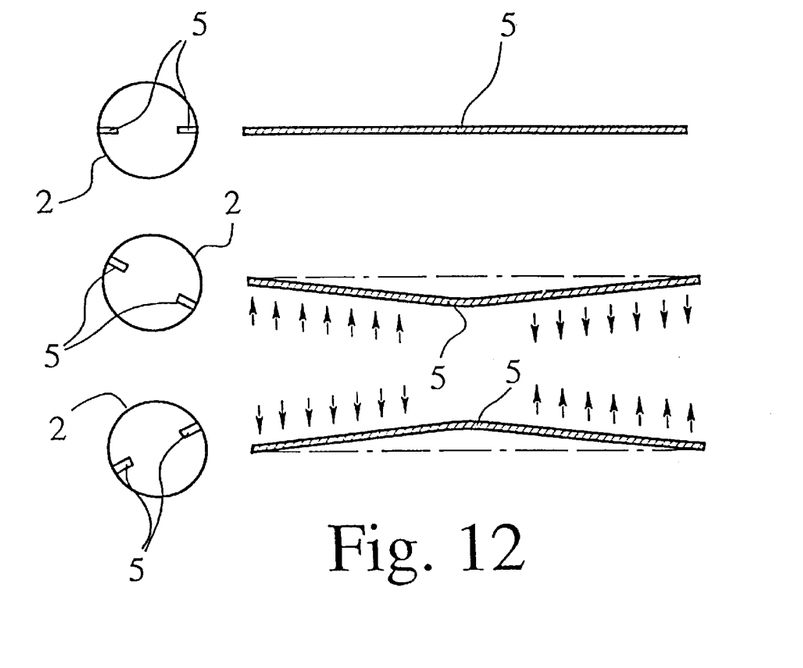
FIG. 12 shows a graphic representation for explaining the embodiment of a mass flow meter in accordance with the invention which is shown in FIGS. 10 and 11.

FIGS. 10, 11, and 12 show an embodiment of a mass flow meter in accordance with the invention which is additionally characterized by the fact that bars 5 extending—like fins—in the longitudinal direction of the Coriolis measuring tube 2, namely three bars 5 in the left part of FIG. 10, four bars 5 in the right-hand part of FIG. 10, and two bars 5 in the middle part of FIG. 10 as well in FIGS. 11 and 12, are provided on the inside of the Coriolis measuring tube 2. In this case, the bars 5, as FIGS. 10, 11, and 12 show, are arranged so as to be distributed uniformly over the circumference of the Coriolis measuring tube 2. The Coriolis forces which appear, as indicated in FIG. 12, act on the bars 5 provided on the inside of the Coriolis measuring tube 2 and thus on the Coriolis measuring tube 2.

The designer has extensive freedom with respect to the sensors 4 provided in the case of the mass flow meters in accordance with the invention, and indeed both with respect to the design as well as with respect to the arrangement of the sensors 4. In particular, as is known in the prior art, e.g electromagnetic or piezo-electric sensors 4, as well as oscillation generators 3, can be used.

FIGS. 3 and 4 show that in each case four sensors 4 are provided. The sensors 4—as viewed along the length of the Coriolis measuring tube—are located symmetrical to the middle of the Coriolis measuring tube, moreover uniformly over the circumference of the Coriolis measuring tube 2.

FIGS. 3 and 4 show embodiments of mass flow meters in accordance with the invention whose Coriolis measuring tube 2 is located concentrically within a circular-cylindrically designed bridge 6. In the case of this embodiment then, in each case, the oscillation generators 3 and the sensors 4 are operative between the Coriolis measuring tube 2 and the bridge 6.

Finally, in accordance with the invention, at least one temperature sensor 7 (FIG. 4) can be provided for compensation of thermal influences on the measuring accuracy and/or the zero point. Preferably, both the Coriolis measuring tube 2 and the bridge 6 are provided with a temperature sensor.

What is claimed is:

1. A mass flow meter for flowing media, which operates according to the Coriolis principle, with a basically straight Coriolis measuring tube (2) having an axis, with two oscillation generators (3) offset from one another about said axis by substantially 180° and acting on said Coriolis measuring tube (2) tangentially in the same direction about said axis leading to an oscillation of said Coriolis measuring tube (2) around said axis, and with at least one sensor detecting Coriolis forces or Coriolis oscillations based on Coriolis forces or both of them.

2. The mass flow meter in accordance with claim 1 wherein four oscillation generators (3) are provided and the oscillation generators (3) act on said Coriolis measuring tube (2) offset by substantially 90° in the same direction tangentially.

3. A mass flow meter for flowing media, which operates according to the Coriolis principle, with a basically straight Coriolis measuring tube (2) having an axis, with at least one sensor detecting Coriolis forces or Coriolis oscillations based on Coriolis forces or both of them, wherein four oscillation generators (3) are provided, wherein two oscillation generators (3a) are located offset with respect to one another about said axis by substantially 180° and act on said Coriolis measuring tube (2) tangentially in the opposite direction about said axis, and the other two oscillation generators (3b) are offset with respect to one another about said axis by 180°, and are offset about said axis with respect to the first oscillation generators (3a) by 90°, respectively, and act on said Coriolis measuring tube 92) in the same direction radially, and the forces exerted by the two first oscillation generators (3a) are directed in the opposite direction to the forces exerted by the other oscillation generators (3b).

4. The mass flow meter in accordance with any one of the claims 1 to 3, wherein said Coriolis measuring tube (2)—as viewed along its length—has different cross-sectional shapes.

5. The mass flow meter in accordance with claim 4, wherein said Coriolis measuring tube (2) has a circular cross-section at both of its ends and an elliptical cross-section in the middle.

6. The mass flow meter in accordance with any one of claims 1 to 3 wherein the oscillation generators (3)—as viewed along the length of said Coriolis measuring tube (2) —are located in the middle of said Coriolis measuring tube (2).

7. The mass flow meter in accordance with any one of the claims 1 to 3, wherein bars (5), preferably two, three, or four bars (5), extending—fin-like—in the longitudinal direction of said Coriolis measuring tube (2) are provided on the inside of said Coriolis measuring tube (2).

8. The mass flow meter in accordance with claim 7 wherein the bars (5) are arranged so as to be distributed uniformly over the circumference of said Coriolis measuring tube (2).

9. The mass flow meter in accordance with any one of the claims 1 to 3 wherein two sensors (4) are provided and the two sensors (4)—viewed along the length of said Coriolis measuring tube (2)—are arranged symmetrical to the middle of said Coriolis measuring tube (2).

10. The mass flow meter in accordance with any one of the claims 1 to 3, wherein several sensors (4) are provided and the several sensors—as viewed along the length of said Coriolis measuring tube (2)—are arranged symmetrical to the middle of said Coriolis measuring tube (2).

11. The mass flow meter in accordance with claim 10 wherein the sensors (4) are arranged so as to be distributed uniformly over the circumference of said Coriolis measuring tube (2).

12. The mass flow meter in accordance with any one of claims 1 to 3 wherein said Coriolis measuring tube (2) is located concentrically within a bridge (6).

13. The mass flow meter in accordance with claim 3, wherein said oscillation generators (3) and said at least one sensor (4) is operative between said Coriolis measuring tube (2) and the bridge (6).

14. The mass flow meter in accordance with any one of the claims 1 to 3, wherein at least one temperature sensor is provided for compensation of thermal influences on the measurement accuracy or the zero point of the flow meter or both of them.

15. The mass flow meter in accordance with claim 14, wherein said Coriolis measuring tube (2) is located concentrically within a bridge (6) and both said Coriolis measuring tube (2) and the bridge (6) are provided with a temperature sensor.

16. The mass flow meter in accordance with any one of claims 1 to 3, wherein said Coriolis measuring tube 92) has an elliptical, a circular, a rectangular, or an approximately figure-eight shaped cross-section.

17. The mass flowmeter in accordance with claim 3 wherein bars (5), preferably two, three, or four bars (5), extending—fin-like-in the longitudinal direction of said Coriolis measuring tube (2) are provided on the inside of said Coriolis measuring tube (2).

18. The mass flow meter in accordance with claim 3 wherein said Coriolis measuring tube (2) is located concentrically within a bridge (6).

\* \* \* \* \*